(12) United States Patent
Panasyuk et al.

(10) Patent No.: US 8,719,433 B2
(45) Date of Patent: May 6, 2014

(54) METHODS AND APPARATUS FOR SCALABLE SECURE REMOTE DESKTOP ACCESS

(75) Inventors: Anatoliy Panasyuk, Bellevue, WA (US); Abolfazl Sirjani, Kirkland, WA (US); Ben Walters, Sammamish, WA (US); Michael Burr, Redmond, WA (US); Min-Chih Lu Earl, Redmond, WA (US)

(73) Assignee: Citrix Systems, Inc, Fort Lauderdale, FL (US)

( * ) Notice: Subject to any disclaimer, the term of this patent is extended or adjusted under 35 U.S.C. 154(b) by 77 days.

(21) Appl. No.: 13/294,965

(22) Filed: Nov. 11, 2011

(65) Prior Publication Data
US 2012/0060204 A1    Mar. 8, 2012

Related U.S. Application Data

(63) Continuation of application No. 10/683,544, filed on Oct. 10, 2003, now abandoned.

(51) Int. Cl.
| | |
|---|---|
| *G06F 15/173* | (2006.01) |
| *G06F 15/16* | (2006.01) |
| *G06F 7/04* | (2006.01) |
| *G06F 17/30* | (2006.01) |

(52) U.S. Cl.
USPC .............. 709/229; 709/223; 709/225; 726/2

(58) Field of Classification Search
USPC ........................................................... 726/2
See application file for complete search history.

(56) References Cited

U.S. PATENT DOCUMENTS

| | | | |
|---|---|---|---|
| 5,696,898 | A | 12/1997 | Baker et al. |
| 5,889,942 | A | 3/1999 | Orenshteyn |
| 5,996,076 | A | 11/1999 | Rowney et al. |
| 6,022,315 | A | 2/2000 | Iliff |
| 6,038,563 | A | 3/2000 | Bapat et al. |
| 6,157,953 | A | 12/2000 | Chang et al. |

(Continued)

FOREIGN PATENT DOCUMENTS

| | | |
|---|---|---|
| EP | 0 967 765 A | 12/1999 |
| WO | WO-02/21414 A | 3/2002 |

OTHER PUBLICATIONS

"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.

(Continued)

*Primary Examiner* — Azizul Choudhury
(74) *Attorney, Agent, or Firm* — Foley & Lardner LLP; John D. Lanza

(57) ABSTRACT

The invention provides scalable, secure, and easily administerable methods and systems for providing remote access to networked resources by combing aspects of physical access limitation measures with traditional computer access limitation measures. The methods and systems utilize an enrollment administration system for specifying enrollment rules, an enrollment system configured to communicate with the enrollment administration system to permit enrolling a first networked resource if permitted by specified enrollment rules, and a remote access system for granting a user remote access to the first networked resource if the user successfully enrolled the first networked resource.

20 Claims, 7 Drawing Sheets

(56) References Cited

U.S. PATENT DOCUMENTS

| | | | |
|---|---|---|---|
| 6,161,139 | A | 12/2000 | Win et al. |
| 6,206,829 | B1 | 3/2001 | Iliff |
| 6,308,273 | B1 | 10/2001 | Goertzel et al. |
| 6,449,627 | B1 | 9/2002 | Baer et al. |
| 6,477,580 | B1 | 11/2002 | Bowman-Amuah |
| 6,482,156 | B2 | 11/2002 | Iliff |
| 6,606,744 | B1 | 8/2003 | Mikurak |
| 6,611,840 | B1 | 8/2003 | Baer et al. |
| 6,629,081 | B1 | 9/2003 | Cornelius et al. |
| 6,636,585 | B2 | 10/2003 | Salzberg et al. |
| 6,671,818 | B1 | 12/2003 | Mikurak |
| 6,675,193 | B1 | 1/2004 | Slavin et al. |
| 6,678,355 | B2 | 1/2004 | Eringis et al. |
| 6,721,805 | B1 | 4/2004 | Bhagwat et al. |
| 6,738,901 | B1 | 5/2004 | Boyles et al. |
| 6,789,112 | B1 * | 9/2004 | Freeman et al. ............ 709/223 |
| 6,820,082 | B1 | 11/2004 | Cook et al. |
| 6,839,701 | B1 | 1/2005 | Baer et al. |
| 6,849,045 | B2 | 2/2005 | Iliff |
| 6,850,252 | B1 | 2/2005 | Hoffberg |
| 6,898,628 | B2 | 5/2005 | Bade et al. |
| 6,920,502 | B2 | 7/2005 | Araujo et al. |
| 6,944,596 | B1 | 9/2005 | Gray et al. |
| 6,947,156 | B1 | 9/2005 | Jeyachandran et al. |
| 6,957,199 | B1 | 10/2005 | Fisher |
| 6,986,102 | B1 | 1/2006 | Baer et al. |
| 7,007,034 | B1 | 2/2006 | Hartman et al. |
| 7,043,488 | B1 | 5/2006 | Baer et al. |
| 7,069,234 | B1 | 6/2006 | Cornelius et al. |
| 7,076,494 | B1 | 7/2006 | Baer et al. |
| 7,085,648 | B2 | 8/2006 | Ishiguro |
| 7,089,239 | B1 | 8/2006 | Baer et al. |
| 7,103,663 | B2 | 9/2006 | Inoue et al. |
| 7,124,101 | B1 | 10/2006 | Mikurak |
| 7,130,807 | B1 | 10/2006 | Mikurak |
| 7,136,903 | B1 | 11/2006 | Phillips et al. |
| 7,143,136 | B1 | 11/2006 | Drenan et al. |
| 7,167,844 | B1 | 1/2007 | Leong et al. |
| 7,171,615 | B2 | 1/2007 | Jensen et al. |
| 7,185,192 | B1 | 2/2007 | Kahn |
| 7,206,851 | B2 | 4/2007 | Delaney et al. |
| 7,216,163 | B2 * | 5/2007 | Sinn ............................. 709/224 |
| 7,243,138 | B1 | 7/2007 | Majkut et al. |
| 7,313,827 | B2 | 12/2007 | Kelley et al. |
| 7,363,363 | B2 * | 4/2008 | Dal Canto et al. ............ 709/223 |
| 7,499,834 | B1 * | 3/2009 | Shivnath et al. .............. 702/185 |
| 2002/0002613 | A1 * | 1/2002 | Freeman et al. ............ 709/225 |
| 2002/0103889 | A1 * | 8/2002 | Markson et al. ............ 709/223 |
| 2002/0138572 | A1 | 9/2002 | Delany et al. |
| 2002/0184217 | A1 | 12/2002 | Bisbee et al. |
| 2003/0014327 | A1 | 1/2003 | Skantze |
| 2003/0177239 | A1 * | 9/2003 | Shinohara et al. ............ 709/226 |
| 2004/0143653 | A1 * | 7/2004 | Taylor et al. .................. 709/223 |
| 2004/0210623 | A1 * | 10/2004 | Hydrie et al. ................ 709/201 |

OTHER PUBLICATIONS

Communication under Rule 51(4) EPC, regarding grant of European patent application No. 04783772.9, dated Sep. 20, 2007.
Examiner's First Report on Australian Patent application No. 2004284747 dated Aug. 26, 2009.
First Examination Report dated Oct. 3, 2010 for Indian Application No. 911/KOLNP/2006.
GoToMyPC Personal™ Registration Screen Shots and Emails, Expertcity, Inc. (Jun. 5, 2001) 9 pages.
GoToMyPC Personal™ User Guide 4.0, Citrix Online, a division of Citrix Systems, Inc., 30 pages.
International Preliminary Report on Patentability and Written opinion. (Dated Apr. 10, 2006) 7 pages.
ISR of PCT/US2004/029682 (dated Nov. 5, 2004, mailed Dec. 11, 2004) 2 pages.
Japanese Official Action on 2006-533905 dated Dec. 21, 2010.
Office Action for EP patent application No. 04783772.9 dated May 12, 2006. (9 pages).
Office Action on U.S. Appl. No. 10/683,544 dated Oct. 2, 2009.
Office Action on U.S. Appl. No. 10/683,544 dated Oct. 6, 2008.
Office Action on U.S. Appl. No. 10/683,544 dated Nov. 23, 2010.
Office Action on U.S. Appl. No. 10/683,544 dated Apr. 14, 2009.
Office Action on U.S. Appl. No. 10/683,544 dated Apr. 15, 2008.
Office Action on U.S. Appl. No. 10/683,544 dated May 11, 2011.
Office Action on U.S. Appl. No. 10/683,544 dated May 13, 2010.
Office Action on U.S. Appl. No. 10/683,544 dated Jun. 4, 2007.
Written Opinion of the International Searching Authority for PCT/US2004/029682 dated May 12, 2006.

* cited by examiner

| Enrollment Rules | | | | | |
|---|---|---|---|---|---|
| | | | Resource Group | | |
| | | | Workstations | CAD Term | Admin Terminals |
| User Group | | IT | X | X | X |
| | | Engineers | X | X | |
| | | Assts | | | X |

|  | Enrolled Machines | | | | | | | | |
|---|---|---|---|---|---|---|---|---|---|
| Users | TermA | TermB | Term C | AdminA | AdminB | AdminC | CAD A | CAD B | CAD C |
| Tara |  | x | x | x |  | x | x | x | x |
| Tom | x |  |  | x | x |  |  | x | x |
| Ted | x | x | x | x | x | x | x | x | x |
| Ellie | x |  |  |  |  |  | x | x |  |
| Erica |  | x |  |  |  |  | x | x |  |
| Edward |  |  | x | x |  |  | x | x | x |
| Alex |  |  |  |  | x |  |  |  |  |
| Amy |  |  |  |  |  | x |  |  |  |
| Andrew |  |  |  |  |  |  |  |  |  |

METHODS AND APPARATUS FOR SCALABLE SECURE REMOTE DESKTOP ACCESS

RELATED APPLICATION

The present application is a continuation of and claims priority to U.S. patent application Ser. No. 10/683,544, entitled "METHODS AND APPARATUS FOR SCALABLE SECURE REMOTE DESKTOP ACCESS", filed Oct. 10, 2003, which is incorporated herein by reference in its entirety for all purposes.

TECHNICAL FIELD

The present invention generally relates to computer networking, and more specifically to a secure method of granting remote access to computer desktops.

BACKGROUND

Many corporate computer users regularly rely on the applications and files stored on the hard drive of their personal office computers for their computing needs. However, most of these computers lack portability, or if portable, can not provide suitable access to resources available to their personal office computers.

In order to provide computer users access to the resources of their personal office computers from remote devices, such as their home computers or laptops, programmers have developed several technologies for remotely accessing the resources of a computer, called a host, from a second, remote device, called a client. Using such technologies, a remote user's client display displays what might be seen on the display of the host computer were the user physically viewing the host display. In addition, remote access software allows remote users to interact with the host computer with the client's input devices, such as a keyboard or mouse, as if the user was using the host's input device. Any computation initiated by the user's input is carried out by the host computer and the results are displayed on the client display as if it were the host display.

While these technologies have been successful and useful on a limited scale, they can present administrative burdens in large scale, enterprise systems. Large enterprise systems require secure regulated access for large numbers of users to large numbers of networked resources. Some systems allow specification of broad access rules that apply to groups of users or resources, but do not typically place access limitations on any individual or individual resource. Some systems have individual permission-based methods that typically require a system administrator to specify access limitations for each and every user and resource. The former methods often provide insufficient security since the access rules tend to be overly broad, and the latter method commonly requires an unusually high level of administrative overhead in large systems.

SUMMARY OF THE INVENTION

One object of the invention is to provide scalable, secure, and easily administerable methods and systems for providing remote access to networked resources by combining aspects of physical access limitation measures with traditional computer access limitation measures.

In one aspect, the invention relates to a method of administering a computer network. The method includes providing an enrollment administration system for specifying enrollment rules, and an enrollment system configured to communicate with the enrollment administration system to permit enrolling a first networked resource if permitted by the specified enrollment rules. The method also includes providing a remote access system for granting a user remote access to the first networked resource if the user successfully enrolled the first networked resource. In one embodiment the networked resource is a computer.

In one embodiment, the remote access system is provided for installation on the first networked resource. In another embodiment, the remote access system is provided for installation on a shared network resource. In this embodiment, the remote access system grants remote access to the first networked resource and a second networked resource subject to the specified enrollment rules and the user's enrollment of the first and second networked resources. In another embodiment, the remote access system denies remote access to a user that has not enrolled the first networked resource. In a further embodiment, the remote access includes remote access to the desktop of the first networked resource.

In another embodiment, the enrollment system disallows enrolling the first network resource from a remote console. In another embodiment, the enrollment system requires enrolling the first networked resource from a console that is physically attached to the first networked resource. In still another embodiment, the enrollment system is a network application. In one embodiment, the method further includes providing a locator system for determining the location of a user attempting to enroll the first networked resource. In a further embodiment, the enrolling of the first networked resource is further subject to the determined location.

In another aspect, the invention relates to a computer system that includes an enrollment administration system for specifying enrollment rules. The computer system also includes a first networked resource that is configured to communicate with the enrollment administration system and a remote device configured to communicate with the first networked resource via a communications channel, such as a network. In addition, the computer system further includes an enrollment system for enrolling the first networked resource if permitted by the specified enrollment rules and a remote access system for granting a user of the remote device remote access to the first networked resource if the first networked resource was successfully enrolled. In one embodiment, the computer system also includes an enrollment database that stores a list of networked resources that a user has enrolled.

In still another aspect, the invention relates to a method of network administration that includes specifying an enrollment rule and enrolling a first networked resource if permitted by the specified enrollment rule. The method also includes granting a user remote access to the first networked resource from a remote device if the user had previously successfully enrolled the first networked resource, and otherwise denying a user access to the first networked resource from the remote device. In one embodiment, specifying an enrollment rule includes defining a plurality of groups of users, defining a plurality of groups of networked resources, and specifying a group of networked resources that a group of users is permitted to enroll.

BRIEF DESCRIPTION OF THE DRAWINGS

The foregoing discussion will be understood more readily from the following detailed description of the invention, when taken in conjunction with the accompanying drawings:

Figure 4:
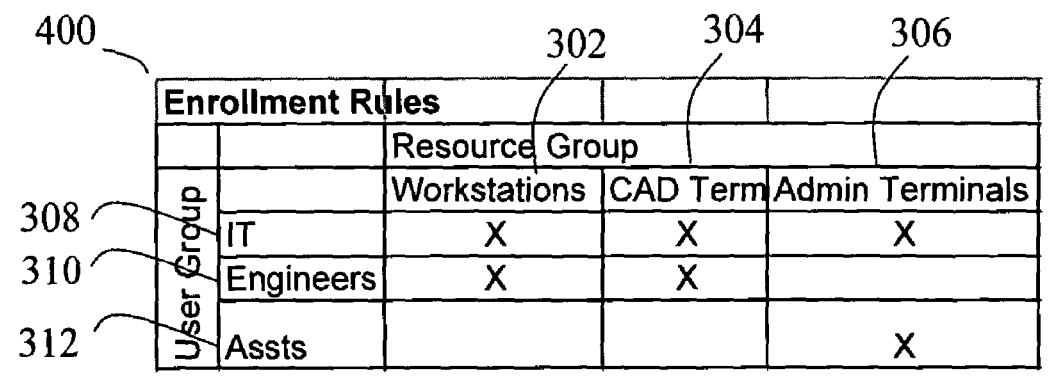

FIG. 4 is a table depicting example enrollment rules according to an illustrative embodiment of the invention.

FIG. 6 is a enrollment database depicting an example set of enrollments according to an illustrative embodiment of the invention.

DETAILED DESCRIPTION

In the physical world, one protects resources by implementing physical access limitations. File cabinets are locked, vaults are sealed, and office doors are closed. In any of these cases, having the key, alone, is not sufficient to access the resources within the cabinet, vault, or office. One must both have the key and simultaneously be physically present at the cabinet, vault, or office. In a traditional networked computer environment, however, improvements in access restrictions have focused on creating more complex locks and keys (e.g., user-password/PIN systems, biometric identity verification, voice verification, etc.) and have largely ignored the security benefits that physical access limitations can provide. That is, for many computer systems, if a user has the appropriate "key," that user can access a networked resource without ever needing to have actually been physically present near the resource. One object of the present invention is to provide scalable, secure, and easily administerable methods and systems for providing remote access to networked resources by combining aspects of physical access limitation measures with traditional computer access limitation measures. Such a combination combines the low-overhead advantages of rules-based access limitations with the individualized security advantages of individual permission-based access limitations, without incurring the associated additional administrative costs.

Figure 1:
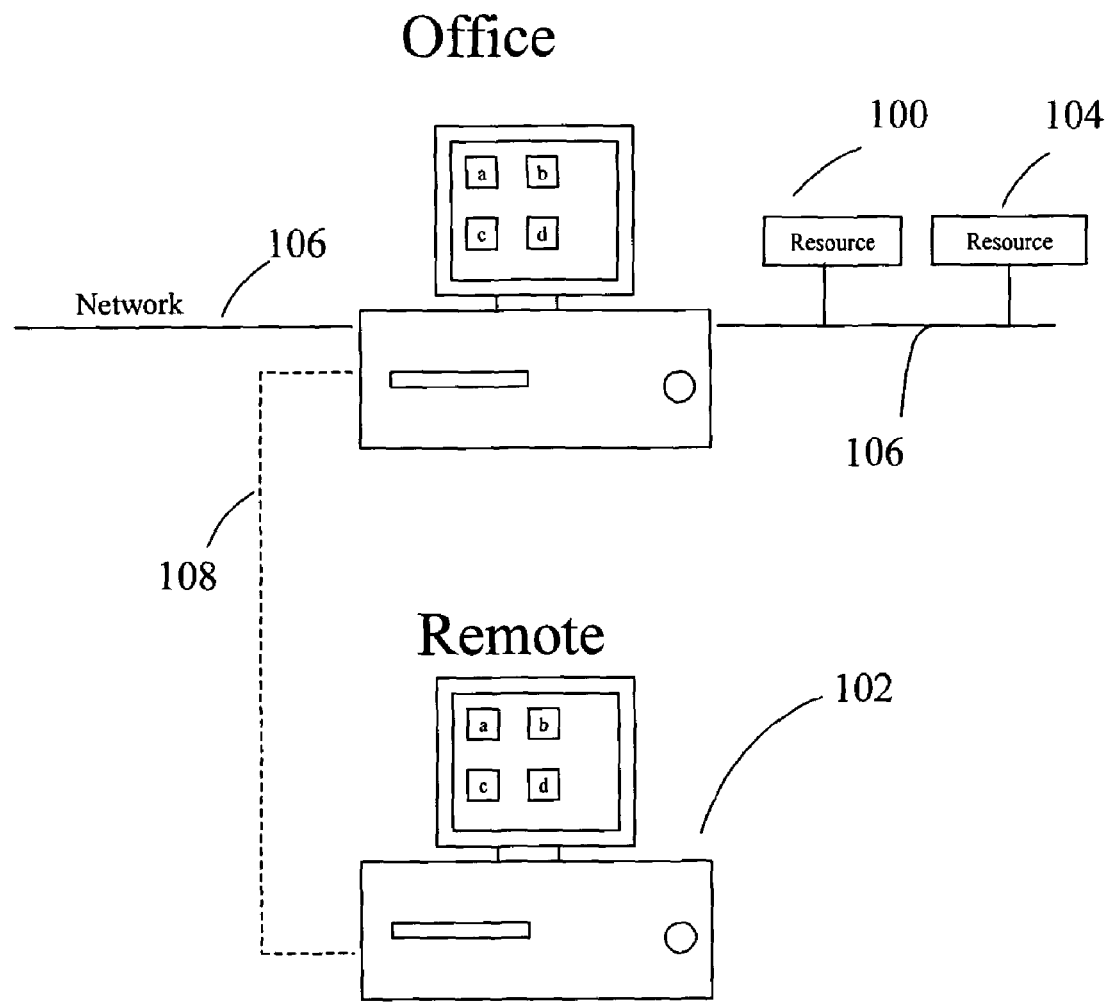
FIG. 1 is a schematic depiction of remote desktop access according to an illustrative embodiment of the invention.

Referring to FIG. 1, a first networked resource 100 is physically located in a particular location, for example, in an office. Networked resources can include, for example, desktop computers, workstations, laptops, handheld computers, mobile phones, personal digital assistants, computing devices that are network capable, printers, storage devices, peripherals, etc., and any data, applications, or capabilities available on or from the resources. The first networked resource 100 may have access to other networked resources 104 via network 106. A remote device 102 is in communication with the first networked resource 100 via a communication link 108, such as a computer network. The remote device 102 may be a computer such as a workstation, desktop computer, laptop, handheld computer, or any other form of computing or telecommunications device that is capable of communication and that has sufficient processor power and memory capacity to perform the operations described herein (e.g., a mobile phone or personal digital assistant). The communication link 108 can be implemented with any of a variety of suitable technologies, for example, over standard telephone lines, LAN or WAN links (using, e.g., 802.11, T1, T3, 56 kb, or X.25 protocols), broadband connections (using, e.g., ISDN, Frame Relay, or ATM protocols), and wireless connections, or some combination of any or all of the above.

In an illustrative embodiment of the invention, the first networked resource 100 is a computer that serves as a host, and the remote device 102 serves as a client. A user of the remote device 102 is granted access to the first networked resource 100 such that the user has access to the desktop of the first networked resource 100. That is, instead of only having access to the services of the first networked resource 100, the display of the remote device 102 displays what a user might see on the console monitor of the first networked resource 100. Likewise, the user can provide input (e.g., keyboard and mouse input) to the first networked resource 100 from the remote device 102 that is interpreted by the first networked resource 100 as if such input were made from a console that is physically attached to first networked resource.

In one such embodiment, remote access is accomplished using MetaFrame Presentation Server®, manufactured by Citrix Systems, Inc. of Ft. Lauderdale, Fla., on the first networked resource 100 in conjunction with the use of Citrix's Independent Computing Architecture® (ICA) clients on the remote device 102.

In an alternative embodiment, remote access is provided by Remote Desktop software. Remote Desktop is a feature included in the Windows XP® Professional operating system, manufactured by Microsoft Corporation of Redmond, Wash., that allows a host computer, such as the first networked resource 100, to provide access to that host's desktop to clients, such as the remote device 102, that have the Remote Desktop client software installed. Remote Desktop client software is included in the Windows XP® operating system and is available for computers running the Windows 95®, Windows 98®, Windows Me®, Windows NT® 4.0, or Windows 2000® operating systems. Remote Desktop uses the Remote Desktop Protocol, also known as RDP, to communicate between the host and the client.

It is to be understood that embodiments of the invention may be implemented using other suitable software and communications protocols. For example, the host could operate a web server that a client could log on to using standard internet protocols such as HTTP. Other systems for remote desktop access include pcAnywhere®, manufactured by Symantec Corporation of Cupertino, Calif.

In addition to, or instead of granting remote desktop access, other embodiments of the invention provide more limited remote access to networked resources. For example, in one embodiment, the invention provides remote access to files stored on a computer. In another embodiment, the invention provides remote access to applications stored on a resource, but not to any data files stored thereon. In another embodiment, the invention provides remote access to a printer, display, or other output device.

In another embodiment, the invention provides only limited remote desktop access. For example, a user might be able to access files physically stored on the computer whose desktop he or she is accessing, but access to other networked resources, such as file server, through via desktop is limited.

Figure 2:
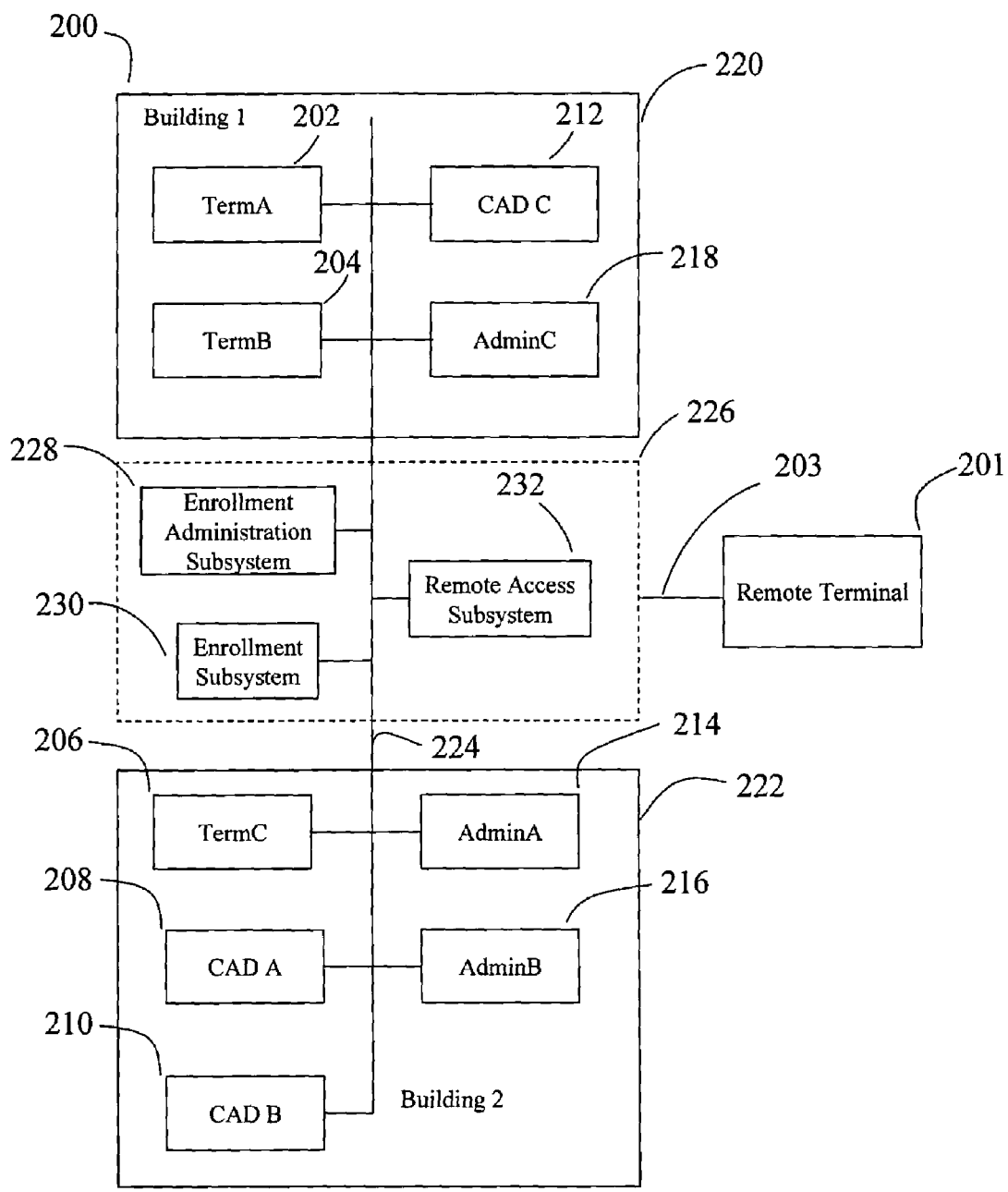
FIG. 2 is a schematic diagram depicting a computer network according to an illustrative embodiment of the invention.

Referring now to FIG. 2, an illustrative computer system 200 includes a number of networked resources, shown in the figure as exemplary computers TermA 202, TermB 204, TermC 206, CAD A 208, CAD B 210, CAD C 212, AdminA 214, AdminB 216, AdminC 218—and referred to collectively as "the computers." The computers 202, 204, 206, 208, 210, 212, 214, 216, and 218 may be geographically proximate or dispersed. For example, some or all computers in the computer system 200 may be located in a different locations than other computers in the computer system. For example, Term 202 could be remote from TermB 204 and the other computers 206, 208, 210, 212, 214, 216 and 218.

As depicted in the figure, however, computers TermA 202, TermB 204, CADC 212, and AdminC 218 are located in a first building 220, and computers TermC 206, CAD A 208, CAD B 210, AdminA 214, and AdminB 216 are located in a second building 222. The computers 202, 204, 206, 208, 210, 212, 214, 216, and 218 are connected to each other over an enterprise-class network 224. The computer system 200 also provides access for a remote device 201 to connect to the network 224 to access one of the computers 202, 204, 206, 208, 210, 212, 214, 216, and 218 and the networked resources. The remote device 201 may be part of or outside of the computer system 200, and connects to the computer system 200 via a communications link 203.

The computer network 200 includes an access administration system 226. In general, the access administration system 226 is a logical grouping of several related systems that are used to determine and govern users' abilities to access and use networked resources. Each system may be located and/or executed on a computer in the first or second buildings 220 and 222, on a computer located in a third building (not shown), on any of the computers previously described 202, 204, 206, 208, 210, 212, 214, 216, and 218, or distributed throughout any or all of the above the computers.

The access administration system 226 includes an enrollment administration system 228 for specifying enrollment rules. In one embodiment the enrollment administration system 228 is a software module or program made available to system administrators, for specifying such rules, although other implementations are possible. Enrollment rules specify which users or groups of users are permitted to enroll individual or groups of networked resources, where enrollment is the act of obtaining authorization to later access a network resource from a remote device 102. A system administrator specifies an enrollment rule by defining groups of one or more users, defining groups of networked resources, and then specifying which group or groups of users are permitted to enroll which group or groups of networked resources.

To facilitate defining groups and specifying rules, in one embodiment the enrollment administration system 228 provides a graphical user interface that allows the system administrator to drag-and-drop users and resources into groups and to drag-and-drop groups into enrollment rules. In another embodiment, the graphical user interface provides a point-and-click interface that allows a system administrator to build groups and rules from lists of users, resources, and groups. In still other embodiments, a system administrator builds a group by typing in a list of user or resource identifiers (e.g., names, user names, email addresses, employee numbers, IP addresses, resource names, etc.). Whichever interface is used, the interface also allows for users or resources to be removed from groups or shifted to other groups and for rules to be altered.

In a further embodiment, the administrator may utilize previously defined groupings. Large organizations often have user and resource groupings defined for other computing purposes. Such groups are defined for example using various domains, Active Directory, or lightweight directory access protocol (LDAP) directories. Resource groups may also be defined by providing ranges of IP addresses.

In one embodiment, enrollment rules are distinct from other access rules. For example, a system administrator may specify enrollment rules that permit a group of users to enroll a group of networked resources for remote access that the users would not otherwise be authorized to use directly. Likewise, a group of users that may be authorized to directly access a group of networked resources may not be authorized to enroll those networked resources for remote access if no such enrollment rule has been specified. In one embodiment, the enrollment administration system stores the enrollment rules in an enrollment rules database. In another embodiment the enrollment administration system 228 also includes an enrollment database that identifies each networked resource that each user has enrolled.

The access administrative system 226 includes an enrollment system 230 configured to communicate with the enrollment administration system 228 to permit enrolling a first networked resource if permitted by specified enrollment rules. In one embodiment, the enrollment system 230 is a network application, in particular, a JAVA® application stored on a central server and downloaded to a networked resource in response to a user's request to enroll a networked resource. The enrollment request may be initiated, for example, by clicking on an icon on the desktop of the networked resource, clicking on a hyperlink on a web page, or requesting to enroll the computer from a menu.

In alternative embodiments the enrollment system 230 operates on a networked server and the user communicates with the enrollment system 230 through a common gateway interface (CGI) via an Internet browser using HTTP, HTML, XML, or another known network protocol. In yet a further embodiment, the enrollment system 230 is installed on a networked resource by transferring the software code embodying the enrollment system 230 onto the networked resource from an electronic storage medium (e.g., a floppy disk, zip disk, CD-ROM, DVD-ROM, etc.).

The enrollment system 230 provides an interface for a user requesting enrollment to identify himself and the resource that the user is requesting to enroll. The enrollment system 230 communicates with the enrollment administration system 228 to determine whether a user is in fact permitted to enroll that resource. In one embodiment, the communication includes sending a message to the enrollment administration system 228 that contains the identification of the user requesting enrollment of the networked resource and the identification of the networked resource the user is requesting to enroll. The communication, in one embodiment, includes transmitting a database query, for example using Structured Query Language (SQL), to the enrollment administration system 228. In another embodiment, the communication includes a remote procedure call to be executed on the enrollment administration system 228, the result of which is a Boolean value indicating whether the user is permitted to enroll the resource. In a further embodiment, the communication includes transmitting a business logic command to be interpreted by the enrollment administration system 228.

In yet another embodiment, the enrollment administration system 228 transmits an up-to-date enrollment rules database to the enrollment system 230. In this embodiment, after receiving the up-to-date enrollment rule database, the enrollment system 230 queries the enrollment rule database (e.g., using SQL) to determine if the user is permitted to enroll the database. The communications may take place over a variety of wired connections (using, e.g., TCP/IP, ISDN, Frame Relay, or ATM protocols), and wireless connections, or some combination of any or all of the above.

In one embodiment, the enrollment system 230 is also responsible for verifying the identity of the user. User identity verification may be conducted, for example, by collecting user name-password/PIN combinations, collecting a user's biometric data, collecting a sample of the user's voice, etc.

The access administrative system 226 also includes a remote access system 232 for granting remote access to the first networked resource if the user successfully enrolled the first networked resource. In one embodiment, the access administration system 226 controls general access to the network (i.e., not to any specific resource), in addition to controlling remote access to individual or groups of networked resources. In one embodiment the remote access system 232 is a software module operating on a central network server. If a user attempts to remotely access a networked resource, the user first contacts the remote access system 232 on the central server. In another embodiment, each enrollable network resource has a copy of the remote access system 232 installed, or the networked resource may download a copy of the enrollment system 230 from a server upon receipt of a remote access request.

In one embodiment, the remote access system 232 receives the request for remote access, verifies the identity of the user requesting access and determines whether that user has enrolled the networked resource that the user is requesting remote access to by consulting an enrollment database maintained by the enrollment administration system 228. If the user has enrolled the networked resource, the remote access system 232 grants permission to the user to access the networked resource and such access is initiated.

In the embodiments described above, the systems 226, 228, 230, and 232 are implemented as software modules or programs. One skilled in the art should appreciate that some or all of the system functionality may instead be implemented in a manner other than just described, for example in hardware, such as an Application Specific Integrated Circuit (ASIC) and the like.

The operation of the systems of the access administration system 226 may be understood further with reference to FIGS. 3-7.

Figure 3A:
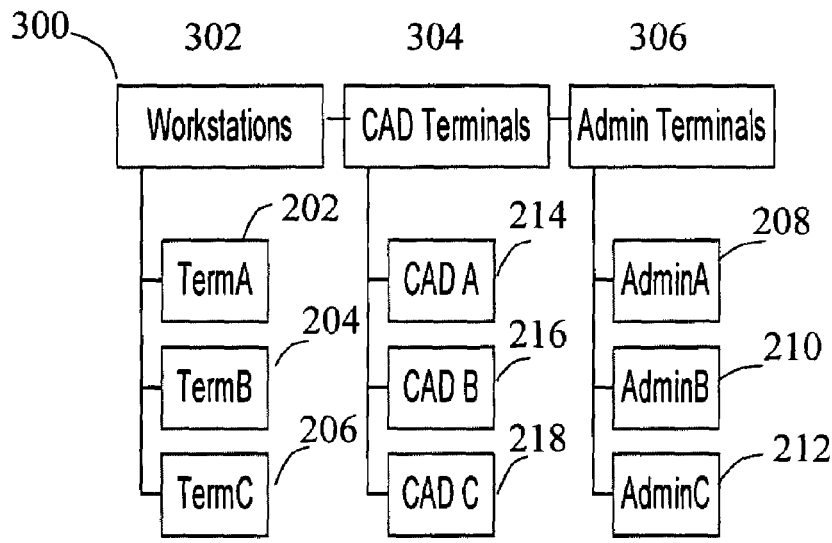
FIG. 3A is a diagram of a set of computer network resource groupings according to an illustrative embodiment of the invention.
Figure 3B:
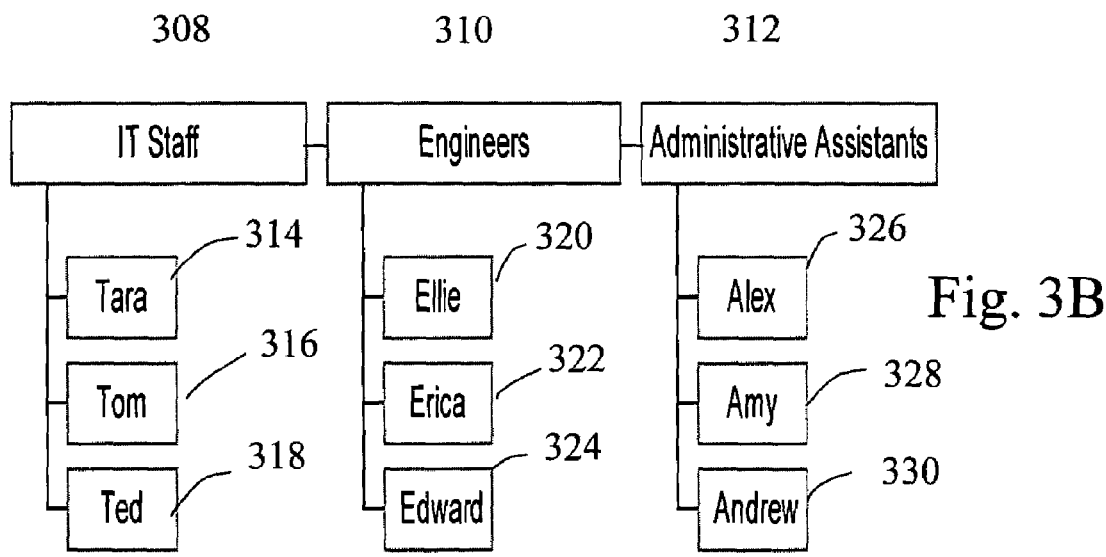
FIG. 3B is a diagram of a set of computer network user groupings according to an illustrative embodiment of the invention.

Referring to FIG. 3A and FIG. 3B, to ease the burden on system administrators, system administrators may use the access administration system 226 or one of its constituent systems to aggregate users and resources into groups that share common characteristics, since as the number of network resources and users of a computer system 200 increases, it becomes increasingly time consuming to individually assign access rights to each user. Referring to FIG. 3A, an illustrative set 300 of network resources of the computer system 200 may be grouped into Workstations 302 which includes TermA 202, TermB 204, and TermC 206; CAD Terminals 304 which includes CAD A 214, CAD B, 216, and CAD C 218; and Administrative Assistant Terminals AdminA 208, AdminB 210 and AdminC 212. Referring to FIG. 3B, an illustrative set 307 of computer users may be grouped as follows: Tara 314, Tom 316, and Ted 318 may be grouped as members of the Information Technology (IT) Staff 308; Ellie 320, Erica 322, and Edward 324 may grouped as Engineers 310, and Alex 326, Amy 328, and Andrew 330 may be grouped as Administrative Assistants 312.

In one embodiment, a system administrator may specify groupings of users and/or resources using the access administration system 226. In one embodiment, the access administration system 226 provides a graphical user interface with which a system administrator may drag and drop, or point-and-click to add users or resources to groups. In another embodiment, the enrollment administration system 228 also provides group-management functionality via a similar interface. The groups created for the purposes of specifying enrollment rules may be different from the groups created for specifying other access rules.

After groups of users and resources are defined, rules may be specified to limit the ability of a group of users 308, 310, or 312 to both directly and/or remotely access and use a group of network resources 302, 304, and 306. For example, since members 314, 316, and 318 of the IT staff 308 are responsible for maintaining the computers 202, 204, 206, 208, 210, 212, 214, 216, and 218, a system administrator would likely want to give the of IT Staff 308 access to all of the computers 202, 204, 206, 208, 210, 212, 214, 216, and 218. In contrast, a system administrator may want to limit Administrative Assistants 312 to only be able to access the Administrative Assistant Terminals with lesser capabilities. Engineers 310 may be granted access to Workstations 302 and CAD Terminals 304, but not to the Administrative Assistant Terminals 306 used by Administrative Assistants 312.

In one embodiment, a system administrator may restrict the ability of a user to remotely access a networked resource without specifying individual user/resource limitations. As mentioned above, the computer system 200 operates under a presumption that a computer user should only be able to remotely access a computer to which the user is capable of achieving direct physical access. If a user does not have physical access to a networked resource, that user should not be able to circumvent physical security measures by accessing the networked resource remotely. Here, physical access means access to an input device (such as a keyboard, mouse, trackball, microphone, touchscreen, joystick, etc.) connected to a console that is physically attached to the networked resource. Connection may include wireless communication in the case where input devices communicate with a resource using a short range wireless signal (e.g., a wireless keyboard or mouse). In a simple example, Engineers 310, in general, have access to CAD Terminals 304 but only in the buildings in which they work. Engineer Ellie 320, working in the second building 222, does not have physical access to CAD C 212, because it is located in the first building 220. Likewise, if Ellie keeps her Workstation 302, TermA 402, in a locked office for privacy or security reasons, other users will not have physical access to that workstation 302.

According to an embodiment of the invention, to enforce this extension of physical access limitations into the remote access environment, the computer system 200 includes the enrollment functionality described above. Namely, a user cannot gain remote access to a networked resource of the computer system 200 if the user has not first enrolled the networked resource. Preferably, a user may only enroll a networked resource if the user requests enrollment using an input device (e.g., keyboard, mouse, microphone, display, etc.) connected to a console that is physically attached to the networked resource. As such, if a user cannot physically access such an input device, the user will not be able to enroll the network resource and will not be able to access the networked resource remotely.

In one such embodiment, not all users who have direct physical access to a computer may enroll the computer. Enrollment rules specify which users or groups of users are authorized to enroll which networked resources or groups of networked resources. Preferably, the enrollment rules are specified at a user/resource group level rather than at an individual user/resource level, for purposes of efficiency. The groups may be the same groups as used for specifying other access rules or the groups may be different.

Referring to FIG. 4A, a table 400 depicts illustrative enrollment rules, where rows represent groups of users 308, 310, and 312, and columns represent groups of networked resources 302, 304, and 306. A system administrator specifies enrollment rules, for example using the enrollment administration system 228. To do so, the system administrator defines a plurality of groups of users 308, 310, and 312 and also defines groups of networked resources 302, 304, and 306 as described above with respect to FIGS. 3A and 3B. The system administrator then specifies which groups of users may enroll which groups of networked resources. For example, in the table 400, a system administrator has specified that IT staff members 308 can enroll Workstations 302, CAD Terminals 304, and Administrative Assistant Terminals 306 as indicated by the "X"s at the intersections of the IT Staff 308 row and the columns for each of the groups of networked resources. Similarly, Engineers 310 can enroll Workstations 302 and CAD Terminals 304, and Administrative Assistants 312 can only enroll Administrative Assistant Terminals 306.

It should be understood that these rules may be specified in a table form as just described, but also or instead through use of commands, data lists, data files, XML tags or any other suitable mechanism for rule specification.

Using the enrollment administration system 228, system administrators can readily alter enrollment rules once specified. For example, to reflect changes in staffing (e.g., the firing, hiring or shifting of an employee) the system administrator may add or remove users to and from user groups. The same may be done for networked resource groups. Policy decisions affecting entire groups may be implemented by changing the groups of networked resources that a group of users is permitted to enroll. For example, if the system administrator that specified the enrollment rules in the table 400 decided that Administrative Assistants 312 should also be able to enroll all workstations, the rule for Administrative Assistants 312 may be altered accordingly. In the case that a system administrator removes the ability of one or more users, or groups of users to enroll one or more network resources, the users affected will no longer be able to enroll those networked resources. In some embodiments, if the networked resources were already enrolled by the affected users, the change in the enrollment rule may cause the networked resources to be unenrolled.

Figure 5:
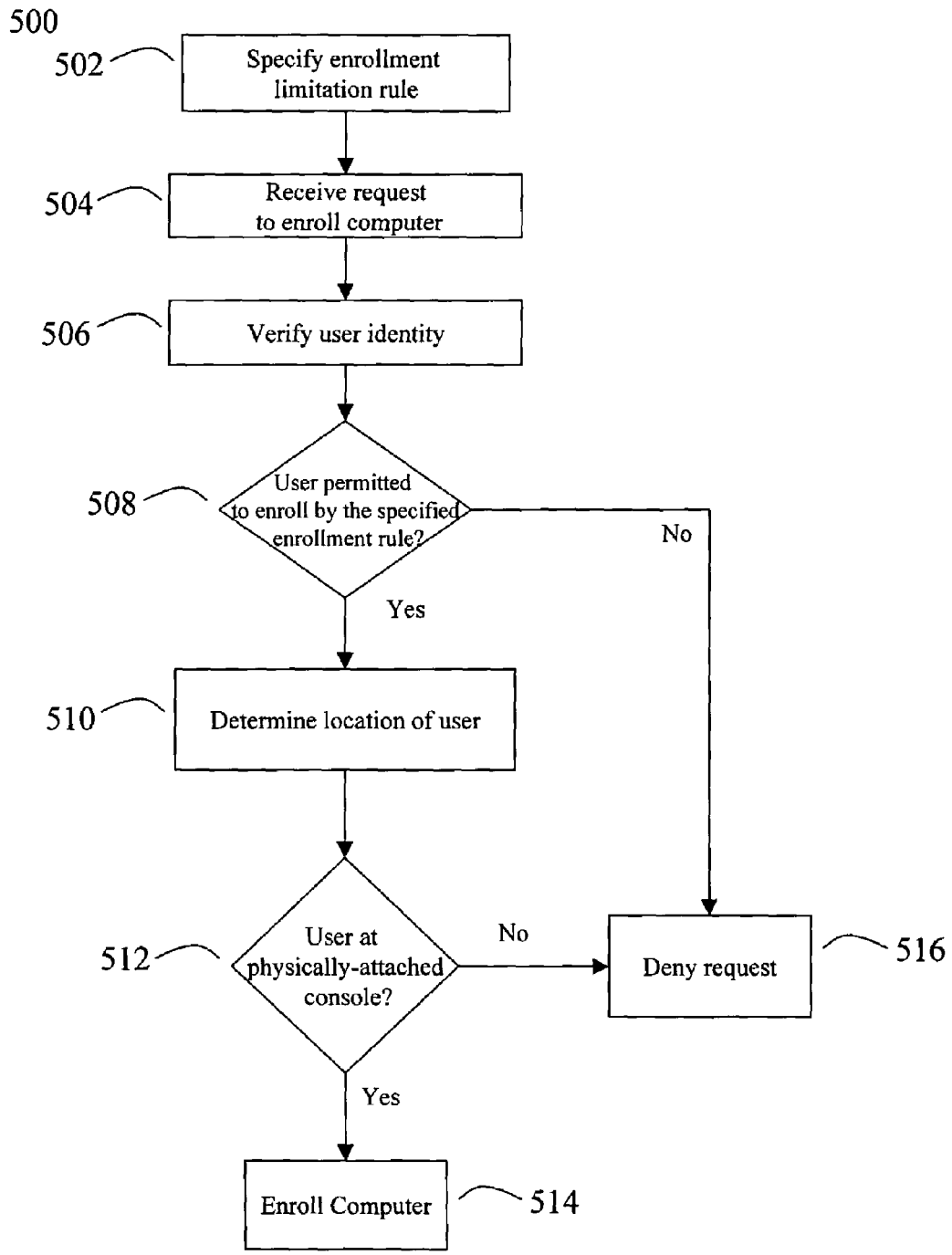
FIG. 5 is a flow chart of a method for enrolling a networked resource according to an illustrative embodiment of the invention.

Referring to FIG. 5, a flow chart of a method 500 of enrolling a networked resource (e.g., computers 202, 204, 206, 208, 210, 212, 214, 216, and 218) begins with specification of enrollment rules (step 502), for example by a system administrator as described above. When a user requests to enroll a networked resource (step 504), the enrollment system 230 verifies the identity of the user (step 506). Identity verification (step 506) may be achieved through any identity authentication means, including for example, user-password or PIN authentication, biometric identification, voice identification, etc.

The enrollment system 230 and the enrollment administration system 228 determine whether the user is permitted by the enrollment rules to enroll the networked resource that the user is requesting to enroll (step 508). In the illustrative embodiment, the enrollment system 230 sends an enrollment request to the enrollment administration system 228. The enrollment request includes the identification of the networked resource that the user is requesting to enroll and the identification of the user. The enrollment administration system 228 then compares the networked resource/user pairing with the enrollment rules to determine if the user is a member of a group that has permission to enroll any of the networked resources of the group to which the networked resource in question belongs.

Single-use copies of the enrollment rules may be downloaded to the networked resource from the enrollment administration system 228 each time a user attempts to enroll a networked resource, and in other implementations a networked resource may maintain a persistent set of enrollment rules that is updated by the enrollment administration system 228 when a system administrator alters the enrollment rules. In either of these cases, the permission verification (step 508) is carried out on the networked resource.

If the user is permitted to enroll the networked resource based on the enrollment rules, the location of the user is determined (step 510). In one embodiment, a locator system determines the location of the user by retrieving the IP address of the networked resource from which the enrollment request was sent, typically included in the header of the packets that made up the communication, and executing a reverse Domain Name Server (DNS) look-up routine to determine the source of the request. The enrollment administration system 228 then determines whether the user requested enrollment of the networked resource from a console that is physically attached to networked resource the user is requesting to enroll (step 512) by comparing the determined enrollment request source with the networked resource that is identified in the enrollment request. In another embodiment, the locator system transmits to, and causes the execution of a Java® applet or ActiveX® control on the requested resource to determine whether the user is actually logged in to a console that is physically attached to the resource. In a further embodiment, the source of the request may be verified by transmitting to, and causing the execution of a Java® applet or ActiveX® control on the source of the request that forces the source to identify itself. The enrollment administration system 228 then compares the forced identification with the network resource the user requested to enroll. In one embodiment, the enrollment administration system carries out a combination of two or more of the above listed verification methods to ensure a robust request source identification.

If it is determined that the user sent the enrollment request from a console that is physically attached to the networked resource that the user is requesting to enroll (step 512), the enrollment administration system 228 enrolls the networked resource for the user (step 514) by updating an enrollment database. (See FIG. 6 below). If the user is not permitted to enroll the networked resource based on the enrollment rules, or it is determined that the user is attempting to enroll the computer from a remote location, enrollment is denied (step 516).

In an alternative embodiment, the enrollment administration system 228 determines the location of the user and verifies that the user is requesting enrollment of the networked resource from which the enrollment request originated before determining whether the user is permitted to enroll the networked resource according to the enrollment rules. In a further embodiment, the enrollment administration system 228 enables a system administrator to specify enrollment rules that allow a group of users to remotely enroll networked resources or to specify groups of resources that may be enrolled remotely. For example, in one embodiment, enrollment rules allow a user to enroll a file server (or a portion of a file server) that is part of a secure network from a console that is a part of that secure network but that is not physically attached to the file server.

Referring to FIG. 6, the enrollment administration system 228 maintains the information about enrolled resources and users. This storage may be implemented in many ways, including in the form of data files in a database. As shown in the illustrative depiction of the contents of an enrollment database 600, in the figure, the database 600 stores enrollment data for each individual user and each networked resource. When a user successfully enrolls a networked resource (step 514), the enrollment is stored in the enrollment database 600. For example, according to the enrollment database 600, engineer Ellie 320 has enrolled TermA, CAD A and CAD B. The table is consulted when a user attempts to remotely access a networked resource.

Figure 7:
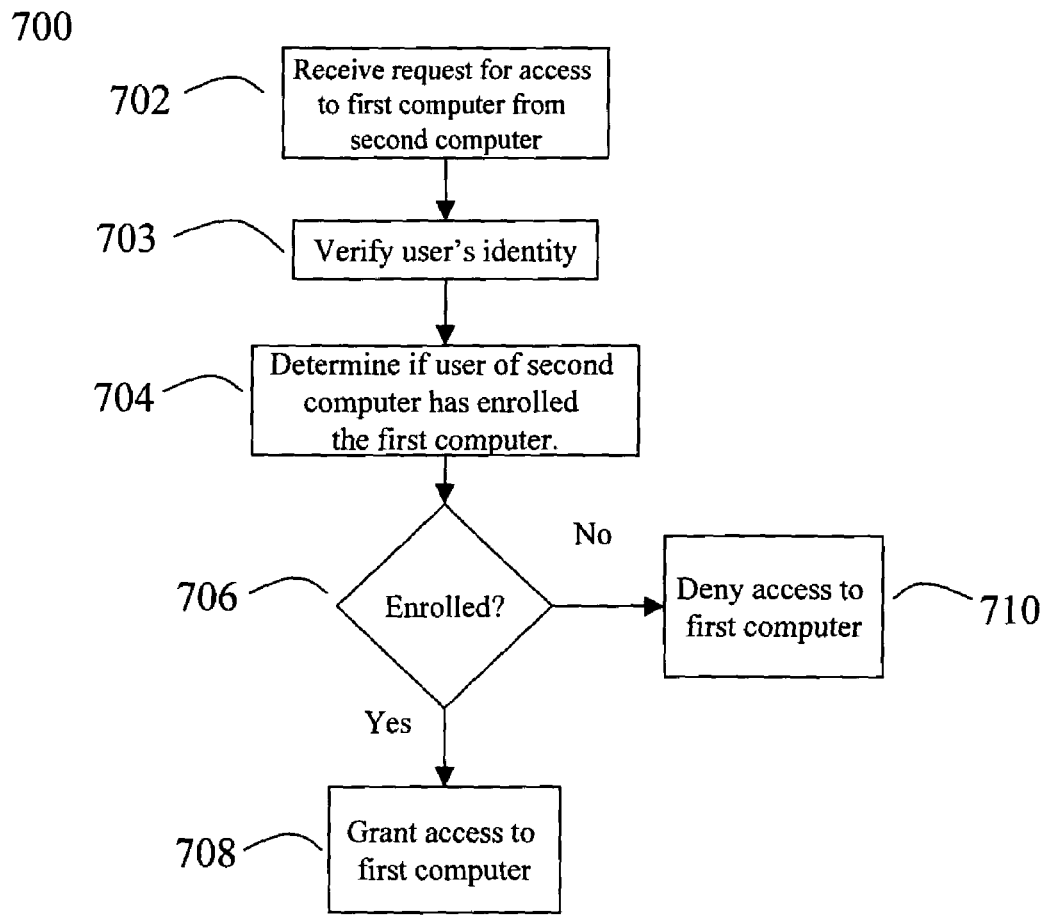
FIG. 7 is a flow chart of a method of granting remote access to a computer according to an illustrative embodiment of the invention.

Referring to FIG. 7, a method 700 of granting remote access to a networked resource includes querying the enrollment database for example, the enrollment database 600. When a user attempts to remotely access the first networked resource 100, the request for access is received by the remote access system 232 (step 702). The remote access system 232 verifies the identification of the user (step 703), also referred to as authentication. As described above in relation to verifying an identity of a user in the enrollment context, the remote access system 232 may authenticate a user using any suitable identity authentication means, including user name-password/PIN pairs, certificates, biometric data, one time keys, voice samples, etc. The remote access system 232 then determines whether the user has previously enrolled the first networked resource 100 (step 706). If the user has previously enrolled the first networked resource, the remote access system 232 grants access to the first networked resource 100 (step 708), otherwise the remote access system 232 denies remote access to the first networked resource 100.

In alternative embodiments, a system administrator could set additional remote access rules that limit which remote devices users may use to remotely access networked resources. For example, a system administrator may specify a rule that only allows users or groups of users to remotely access networked resources or a group of networked resources from a networked resource directly connected to the computing system 200. Under such a rule, Tara 314, for example, who according to the enrollment database 600 has enrolled AdminC 218, could remotely access AdminC 218 from AdminA 214, but Ted 318, who also has enrolled AdminC 218 could not remotely access AdminC from remote device 102.

One skilled in the art will realize the invention may be embodied in other specific forms without departing from the spirit or essential characteristics thereof. The foregoing embodiments are therefore to be considered in all respects illustrative rather than limiting of the invention. The scope of the invention is not limited to just the foregoing description.

What is claimed is:

1. A method of enrolling networked resources via an enrollment system communicating with an enrollment administration system permitting enrollment based on enrollment rules stored in an enrollment database, the method comprising:

(a) enrolling a networked resource to later access the networked resource remotely, wherein enrolling the networked resource comprises:

(1) receiving, by an enrollment system executing on a computing machine, an enrollment request from a console that is physically attached to the networked resource and from a user to enroll the networked resource;

(2) authenticating, by the enrollment system, an identity of the user;

(3) sending, by the enrollment system to an enrollment administration system executing on the computer machine, the enrollment request;

(4) determining, by the enrollment administration system, if the user is permitted to enroll the networked resource based upon identifying at least one of a plurality of enrollment rules in an enrollment database;

(5) determining, by the enrollment administration system, if the user sent the enrollment request from the console that is physically attached to the networked resource;

(6) enrolling, by the enrollment administration system, the networked resource responsive to determining (i) if the user is permitted to enroll the networked resource and (ii) if the user sent the enrollment request from the console that is physically attached to the networked resource;

(b) establishing an initial remote connection to access the networked resource, wherein establishing the initial remote connection comprises:

(1) receiving, by a remote access system, an access request from the user to access the networked resource from a remote location, wherein the access request is distinct from the enrollment request;

(2) verifying, by the remote access system, the identity of the user;

(3) determining, by the remote access system, if network resource has been previously enrolled by the user; and (4) granting, by the remote access system, responsive to the determination, remote access to the network resource.

2. The method of claim 1 wherein the-remote access to the networked resource uses a remote display protocol.

3. The method of claim 1, further comprising identifying an enrollment rule by: defining a plurality of groups of users; defining a plurality of groups of networked resources; and specifying a group of networked resources that a group of users is permitted to enroll.

4. The method of claim 1 wherein enrolling the networked resource is disallowed from a remote console.

5. The method of claim 1 wherein enrolling the networked resource requires the user to enroll from the console physically attached to the networked resource.

6. The method of claim 1 wherein granting access to the networked resource further comprises granting access to the desktop of the networked resource computing device.

7. The method of claim 1 wherein the enrollment administration system is a network application.

8. The method of claim 1 further comprising denying access to the networked resources upon determining the user had not previously successfully enrolled the networked resource via the enrollment administration system.

9. The method of claim 1 wherein the enrollment request includes an identification of the networked resource the user is requesting to enroll and the identification of the user.

10. The method of claim 1 further comprising adding an enrollment record of the networked resource for the user to the enrollment database.

11. A system for enrolling networked resources via an enrollment system communicating with an enrollment administration system permitting enrollment based on enrollment rules stored in an enrollment database, the system comprising:

(a) an enrollment system executing on a computing machine, the enrollment system:

(1) receiving an enrollment request from a console that is physically attached to the networked resource and from a user to enroll a networked resource;
(2) authenticating an identity of the user;
(b) an enrollment administration system executing on the computing machine to enroll the networked resource to later access the network resource remotely, the enrollment administration system:
(1) receiving, an enrollment request from the enrollment system;
(2) determining if the user is permitted to enroll the networked resource based upon identifying at least one of a plurality of enrollment rules in an enrollment database;
(3) determining if the user sent the enrollment request from the console that is physically attached to the networked resource;
(4) enrolling the networked resource responsive to determining (i) if the user is permitted to enroll the networked resource and (ii) if the user sent the enrollment request from the console that is physically attached to the networked resource;
(c) a remote access system to establish an initial remote connection to access the networked resource, executing on the computing machine, the remote access system:
(1) receiving an access request from the user to access the networked resource from a remote location, wherein the access request is distinct from the enrollment request;
(2) verifying the identity of the user;
(3) determining, if network resource has been previously enrolled by the user; and
(4) granting, responsive to the determination, remote access to the network resource.

12. The system of claim 11 wherein remote access to the networked resource uses a remote display protocol.

13. The system of claim 11 wherein the enrollment administration system identifies an enrollment rule by: defining a plurality of groups of users; defining a plurality of groups of networked resources; and specifying a group of networked resources that a group of users is permitted to enroll.

14. The system of claim 11 wherein the enrollment administration system does not have permission to enroll the networked resource from a remote console.

15. The system of claim 11 wherein the enrollment administration system requires the user to enroll from the console physically attached to the networked resource.

16. The system of claim 11 wherein the enrollment administration system grants access to the desktop of a networked computing device resource.

17. The system of claim 11 wherein the enrollment system is a network application.

18. The system of claim 11 wherein the enrollment administration system denies access to the networked resources upon determining the user had not previously successfully enrolled the networked resource via the enrollment administration system.

19. The system of claim 11, wherein the enrollment request includes an identification of the networked resource the user is requesting to enroll and the identification of the user.

20. The system of claim 11, wherein the enrollment administration system adds an enrollment record of the networked resource for the user to the enrollment database.

* * * * *